United States Patent
Yelverton et al.

(10) Patent No.: US 11,452,294 B2
(45) Date of Patent: Sep. 27, 2022

(54) **USE OF TEBUCONAZOLE FOR ANNUAL BLUEGRASS (*POA ANNUA*) CONTROL IN TURFGRASSES**

(71) Applicants: North Carolina State University, Raleigh, NC (US); Clemson University Research Foundation, Clemson, SC (US)

(72) Inventors: Fred H. Yelverton, Raleigh, NC (US); Lambert McCarty, Clemson, SC (US)

(73) Assignees: North Carolina State University, Raleigh, NC (US); Clemson University Research Foundation, Clemson, SC (US)

( * ) Notice: Subject to any disclaimer, the term of this patent is extended or adjusted under 35 U.S.C. 154(b) by 176 days.

(21) Appl. No.: 16/770,442

(22) PCT Filed: Dec. 6, 2018

(86) PCT No.: PCT/US2018/064193
§ 371 (c)(1),
(2) Date: Jun. 5, 2020

(87) PCT Pub. No.: WO2019/113281
PCT Pub. Date: Jun. 13, 2019

(65) Prior Publication Data
US 2021/0161139 A1    Jun. 3, 2021

Related U.S. Application Data

(60) Provisional application No. 62/595,363, filed on Dec. 6, 2017.

(51) Int. Cl.
*A01N 43/90*    (2006.01)
*A01N 43/653*   (2006.01)
*A01N 33/04*    (2006.01)
*A01N 33/18*    (2006.01)

(52) U.S. Cl.
CPC .......... *A01N 43/653* (2013.01); *A01N 33/04* (2013.01); *A01N 33/18* (2013.01); *A01N 43/90* (2013.01)

(58) Field of Classification Search
None
See application file for complete search history.

(56) References Cited

U.S. PATENT DOCUMENTS

| | | |
|---|---|---|
| 5,223,524 A | 6/1993 | Valcke |
| 2006/0143741 A1 | 6/2006 | Hignight et al. |
| 2011/0195841 A1 | 8/2011 | Dittgen et al. |
| 2015/0045214 A1 | 2/2015 | Bristow |
| 2016/0000074 A1 | 1/2016 | Young |

FOREIGN PATENT DOCUMENTS

| | | | |
|---|---|---|---|
| CN | 102285842 A | * | 12/2011 |
| CN | 104351199 A | * | 2/2015 |
| CN | 104351206 A | * | 2/2015 |
| CN | 104886072 A | * | 9/2015 |
| CN | 105613513 A | * | 6/2016 |
| CN | 105660652 A | * | 6/2016 |

OTHER PUBLICATIONS

International Search Report and Written Opinion for Application No. PCT/US2018/064193 dated Mar. 7, 2019 (8 pages).
Chemontba, "Lynx," Mar. 25, 2015, retrieved on Feb. 6, 2019, from <https://www.google.com/search?rtz=1C2GGRV_enUS763US765&source=hp&ei=JtxmXJicD6eCjwSi_pigCg&q=https%3A%2F%2Fwww.chemontba.sk%2Fpripravok%2Flynx%2F&btnK=Google+Search&oq=https%3A%2F%dFwww.chemantba.sk%2pripravook%2Flynx%2F&gs_l=psy-ab.3...1596.1596..1847...0.0..0.82.82.1......2j1..gws-wiz.....0.cdzl8mE5f7c&as_qdr=y15>.
TurfNet, "Lynx Fungicide On Poa," Dec. 10, 2007, retrieved on Feb. 5, 2019 from <https://www.turfnet.com/forums/topic/553-lynx-fungicide-on-poa/>.

* cited by examiner

Primary Examiner — Alton N Pryor
(74) Attorney, Agent, or Firm — Michael Best & Friedrich LLP

(57) ABSTRACT

Disclosed are methods for selectively controlling or modifying the growth of *Poa annua* in a turfgrass using a composition comprising an herbicidally-effective amount tebuconazole, or a salt thereof.

14 Claims, No Drawings

USE OF TEBUCONAZOLE FOR ANNUAL BLUEGRASS (*POA ANNUA*) CONTROL IN TURFGRASSES

CROSS-REFERENCE TO RELATED APPLICATIONS

This application claims the benefit of U.S. Provisional Patent Application No. 62/595,363, filed on Dec. 6, 2017, the entire content of which is fully incorporated herein by reference.

TECHNICAL FIELD

This present disclosure relates to methods for selectively controlling or modifying the growth of annual bluegrass (*Poa annua*) in a turfgrass using a composition comprising an herbicidally-effective amount of tebuconazole, or a salt thereof.

BACKGROUND

Annual bluegrass (*Poa annua*) is one of the most invasive weeds in turfgrass and one of the most difficult to controls. The appearance of *Poa annua* is similar to regular lawn grass except it is a lighter shade of green, has shallower roots, and develops a seed head early in the season. *Poa annua* is classified as a winter annual, meaning it germinates late in the summer and into the fall, lives through the winter as a mature plant, produces a seed crop in the spring, and dies off in the summer heat. *Poa annua* survives as a weed due to its high genetic variability, short life cycle, tolerance of compacted soil, and rapid germination. Each *Poa annua* plant produces between 1,000 and 2,250 seeds in a season that can easily spread on contact. *Poa annua* is vulnerable to diseases and intolerant of high heat, which means it dies off quickly during the summer months leaving unwanted and unpleasant brown and/or bare patches in turfgrasses.

Maintenance of turfgrass health is particularly important on golf courses and other sports turfs where it is desirable to provide a playable and aesthetically appealing playing surface year round. Turfgrass management professionals, including golf course superintendents, sports field managers, sod producers, and lawn care professionals, relentlessly attempt to eradicate *Poa annua* from their turfs. The earliest attempts to control *Poa annua* were to simply cut it out when it appeared, but this technique is very labor intensive and expensive. Chemical controls for *Poa annua* are difficult due to increasing herbicide regulation and the desire to maintain the quality of the preferred species in the turfgrass. In addition, the use of conventional herbicides is challenging due to the lack of an effective herbicide specific for *Poa annua*. Turf managers are hesitant to adopt the use of new herbicides for *Poa annua* control because the application can lead to unexpected phytotoxic effects or turf injury. Thus, there is a need for an effective method to selectively control *Poa annua* in turfgrasses where the existing turf is undamaged.

SUMMARY

The present disclosure is directed to a method for selectively controlling or modifying the growth of *Poa annua* in a turfgrass without causing significant injury to the turfgrass. The method comprises applying at least one application of a composition to the turfgrass or to the locus of the *Poa annua* in such turfgrass. The composition comprises an herbicidally-effective amount tebuconazole, or a salt thereof.

DETAILED DESCRIPTION

The present disclosure provides methods for selectively controlling or modifying the growth *Poa annua* in turfgrass without damaging the turfgrass. The methods involve treating the turfgrass with a composition comprising an herbicidally-effective amount of tebuconazole, or a salt thereof. In some embodiments, the methods involve applying the composition comprising the tebuconazole to the turfgrass before the turfgrass is overseeded with a cool season turfgrass and optionally applying the composition comprising the tebuconazole again after overseeding. Typically, overseeding is completed in mid-fall when temperatures are still warm enough to promote germination and growth of the cool season grasses prior to winter. Unfortunately, this time period also coincides with *Poa annua* germination, such that both *Poa annua* and the desired cool season grass populate the turf throughout the winter.

Tebuconazole is a triazole fungicide typically used on turfgrasses and ornamental plants to treat diseases caused by pathogenic fungi. Tebuconazole is typically applied about 1-2 weeks after seeding or at seedling germination and emergence of the turfgrass or the overseeded cool season turfgrass. For example, tebuconazole is applied in the fall in the southeastern United States after turfgrasses are overseeded with a cool season grass. As exemplified below, compositions comprising tebuconazole have the unique ability to control *Poa annua* populations in turfgrass when applied prior to overseeding, which is not a common characteristic to other fungicides of similar chemical structure or mechanism of fungicidal action. In the amounts necessary for herbicidal control of *Poa annua*, tebuconazole does not induce any phytotoxic effects. The present disclosure therefore provides a surprising and unexpected capability of tebuconazole to be used as an effective herbicide in controlling *Poa annua*.

1. Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

"Fungicide" as used herein refers to a chemical substance or a biological organism used to kill or inhibit growth of a fungus or fungal spore. A "fungicidal effect" as used herein refers to an effect of killing and inhibiting the growth of fungi. A "fungicidally-effective amount" as used herein refers to an amount of an active ingredient that causes a fungicidal effect.

"Herbicide" as used herein refers to a chemical substance used to control unwanted plants. Herbicides are commonly known as weed killers. Herbicides comprise an active ingredient that kills, controls, or otherwise adversely modifies the growth of vegetation. An "herbicidal effect" as used herein refers to an adversely modifying effect on plants and includes deviations from, for instance, natural development, killing, regulation, desiccation, and retardation.

A "herbicidally-effective amount" as used herein refers to an amount of an active ingredient that causes an herbicidal effect.

The terms "plants" and "vegetation" as used herein can include, for instance, germinant seeds, emerging seedlings, and established vegetation.

"Overseeding" as used herein refers to planting of grass seed directly into existing turf, without tearing up the turf or the soil. Overseeding is commonly employed to fill in bare spots, improve turf density, establish different grass varieties within the turf, and enhance turf appearance.

A "turfgrass" as used herein refers to any species of grass grown to form turf.

2. Method of *Poa annua* Control in Turfgrasses

The present disclosure relates a method of selectively controlling or modifying the growth of *Poa annua* in turfgrass without causing significant injury to the turfgrass. The method involves applying at least one application of a composition that includes an herbicidally-effective amount of tebuconazole, or a salt thereof, to the turfgrass or to a locus or localized area of the *Poa annua* in said turfgrass. In some embodiments, the growth of the *Poa annua* in the turfgrass is reduced compared to the growth of the *Poa annua* in a control turfgrass that has not been given an application of the composition. In some embodiments, the at least one application is applied to the turfgrass before *Poa annua* emerges. In some embodiments, the turfgrass is overseeded with another turfgrass, such as a cool season turfgrass.

(a) Composition Containing Tebuconazole

Embodiments of the present disclosure include methods that apply a composition comprising an herbicidally-effective amount of tebuconazole, or a salt thereof, to selectively control or modify the growth of *Poa annua* populations in turfgrasses. Tebuconazole (1-(4-chlorophenyl)-4,4-dimethyl-3-(1,2,4-triazol-1-ylmethyl)pentan-3-ol) is a triazole fungicide and a member of the class of demethylation inhibiting (DMI) or sterol biosynthesis inhibitor (SBI) fungicides, which include triazoles and imidazoles. DMI fungicides inhibit the biosynthesis of ergosterol, a major component of the plasma membrane of fungi and necessary for fungal growth. Tebuconazole, a broad spectrum fungicide used to treat pathogenic and foliar plant fungi, acts as a sterol inhibiting fungicide to prevent spores from germinating and inhibit the growth of the fungus. Tebuconazole is commonly supplied as a liquid product but is also available in solid, powder forms. In some embodiments, the herbicidally-effective amount can be the same amount as a fungicidally-effective amount. In some embodiments, the herbicidally-effective amount can be a different amount as a fungicidally-effective amount.

In some embodiments, the compositions can include about 30-50% (wt/wt) tebuconazole, or a salt thereof. For example, the composition can have about 30% to about 50% (wt/wt), about 35% to about 50% (wt/wt), about 40% to about 50% (wt/wt), about 45% to about 50% (wt/wt), about 30% to about 45% (wt/wt), about 35% to about 45% (wt/wt), about 40% to about 45% (wt/wt), about 30% to about 40% (wt/wt), or about 35% to about 40% (wt/wt) of tebuconazole, or a salt thereof. In some embodiments, the compositions can have about 30% (wt/wt), about 35% (wt/wt), about 36% (wt/wt), about 37% (wt/wt), about 38% (wt/wt), about 38.5% (wt/wt), about 38.6% (wt/wt), about 38.7% (wt/wt), about 38.8% (wt/wt), about 38.9% (wt/wt), about 39% (wt/wt), about 40% (wt/wt), about 45% (wt/wt), or about 50% (wt/wt) of tebuconazole, or a salt thereof.

In some embodiment, the compositions can include about 35-55% (wt/vol) tebuconazole, or a salt thereof. For examples, the composition can have about 35 to about 55% (wt/vol), about 40% to about 55% (wt/vol), about 35% to about 50% (wt/vol), or about 40% to about 50% (wt/vol) of tebuconazole, or a salt thereof. In some embodiments, the compositions can have about 30% (wt/vol), about 35% (wt/vol), about 40% (wt/vol), about 41% (wt/vol), about 42% (wt/vol), about 43% (wt/vol), about 44% (wt/vol), about 45% (wt/vol), about 50% (wt/vol), or about 55% (wt/vol) of tebuconazole, or a salt thereof.

In some embodiments, the composition can be in a form selected from a granule, a wettable powder, an emulsifiable concentrate, a dust, a flowable powder, a solution, a suspension, an emulsion, or a microcapsule. In some embodiments, the composition is a suspension.

(b) Application of the Composition

Embodiments of the present disclosure include methods that involve applying at least one application of the composition described above to the turfgrass or a locus or localized area of the *Poa annua* in said turfgrass. In general, the application of the composition described above will vary depending on the concentration of *Poa annua* in the turfgrass, the type of turfgrass, and the desired amount of reduction to *Poa annua* populations.

In some embodiments, an application of the composition can be at a rate of coverage between about 0.5 fl oz of the composition per 1000 sq ft of turfgrass to about 5 fl oz of the composition per 1000 sq ft of turfgrass. In some embodiments, an application of the composition can be at a rate of coverage of between about 0.5 fl oz/1000 sq ft to about 5 fl oz/1000 sq ft, between about 0.5 fl oz/1000 sq ft to about 4 fl oz/1000 sq ft, between about 0.5 fl oz/1000 sq ft to about 3 fl oz/1000 sq ft, between about 0.5 fl oz/1000 sq ft to about 2 fl oz/1000 sq ft, between about 0.5 fl oz/1000 sq ft to about 1 fl oz/1000 sq ft, between about 1 fl oz/1000 sq ft to about 5 fl oz/1000 sq ft, between about 1 fl oz/1000 sq ft to about 4 fl oz/1000 sq ft, between about 1 fl oz/1000 sq ft to about 3 fl oz/1000 sq ft, or between about 1 fl oz/1000 sq ft to about 2 fl oz/1000 sq ft. In some embodiments, an application of the composition can be at a rate of coverage of about 0.5 fl oz of the composition per 1000 sq ft of turfgrass, about 1 fl oz/1000 sq ft, about 1.5 fl oz/1000 sq ft, about 1.6 fl oz/1000 sq ft, about 1.7 fl oz/1000 sq ft, about 1.8 fl oz/1000 sq ft, about 1.9 fl oz/1000 sq ft, about 2 fl oz/1000 sq ft, about 2.5 fl oz/1000 sq ft, about 3 fl oz/1000 sq ft, about 3.5 fl oz/1000 sq ft, about 4 fl oz/1000 sq ft, about 4.5 fl oz/1000 sq ft, or about 5 fl oz/1000 sq ft. In some embodiments, an application of the composition can be at a rate of coverage of about 1.8 fl oz of the composition per 1000 sq ft of turfgrass.

It is understood that an application of the composition can be applied in a sufficient amount of water to achieve the desired rate of coverage. In some embodiments, the amount of water to achieve the rate of coverage listed above can be about 1.5 gallons to about 3.0 gallons of water per 1000 sq ft of turfgrass. For example, a rate of coverage of about 1.8 fl oz of the composition per 1000 sq ft of turfgrass can be achieved by adding 1.8 fl oz of the composition to about 1.5 gallons to about 3.0 gallons of water which is then distributed over 1000 sq ft of turfgrass.

In some embodiments, more than one application of the composition per year can be applied to the turfgrass as needed to maintain and control the *Poa annua* in turfgrass. In some embodiments, the number of applications per year can be between one and five. For example, one application, two applications, three applications, four applications, or five applications may be applied to the turfgrass over a period of a year. In some embodiments, the applications are applied to the turfgrass periodically within the year. In some embodiments, at least one application can be applied to the turfgrass before the turfgrass goes dormant, such as at least about 1 month to about 3 months before the turfgrass goes dormant. For example, at least one application may be applied to the turfgrass at least about 1 week, about 2 weeks, about 3 weeks, about 4 weeks, about 1 month, about 1.5 months, about 2 months, or about 3 months before the turfgrass goes dormant. In some embodiments, more than one application can be applied to the turfgrass before the turfgrass goes dormant. In some embodiments, an application can be applied to the turfgrass after the turfgrass goes dormant.

In some embodiments, the total amount of the composition applied per year is between about 0.5 fl oz of the composition per 1000 sq ft of turfgrass to about 10 fl oz of the composition per 1000 sq ft of turfgrass. In some embodiments, the total amount of the composition applied per year is between about 0.5 fl oz/1000 sq ft to about 10 fl oz/1000 sq ft, between about 0.5 fl oz/1000 sq ft to about 7.5 fl oz/1000 sq ft, between about 0.5 fl oz/1000 sq ft to about 5 fl oz/1000 sq ft, between about 0.5 fl oz/1000 sq ft to about 4 fl oz/1000 sq ft, between about 0.5 fl oz/1000 sq ft to about 3 fl oz/1000 sq ft, between about 0.5 fl oz/1000 sq ft to about 2 fl oz/1000 sq ft, between about 0.5 fl oz/1000 sq ft to about 1 fl oz/1000 sq ft, between about 1 fl oz/1000 sq ft to about 10 fl oz/1000 sq ft, between about 1 fl oz/1000 sq ft to about 7.5 fl oz/1000 sq ft, between about 1 fl oz/1000 sq ft to about 5 fl oz/1000 sq ft, between about 1 fl oz/1000 sq ft to about 4 fl oz/1000 sq ft, between about 1 fl oz/1000 sq ft to about 3 fl oz/1000 sq ft, between about 2 fl oz/1000 sq ft to about 10 fl oz/1000 sq ft, between about 2 fl oz/1000 sq ft to about 7.5 fl oz/1000 sq ft, between about 2 fl oz/1000 sq ft to about 5 fl oz/1000 sq ft, between about 2 fl oz/1000 sq ft to about 4 fl oz/1000 sq ft, or between about 2 fl oz/1000 sq ft to about 3 fl oz/1000 sq ft. In some embodiments, the total amount of the composition applied per year is about 0.5 fl oz of the composition per 1000 sq ft of turfgrass, about 1 fl oz/1000 sq ft, about 1.5 fl oz/1000 sq ft, about 1.6 fl oz/1000 sq ft, about 1.7 fl oz/1000 sq ft, about 1.8 fl oz/1000 sq ft, about 1.9 fl oz/1000 sq ft, about 2 fl oz/1000 sq ft, about 2.5 fl oz/1000 sq ft, about 3 fl oz/1000 sq ft, about 3.5 fl oz/1000 sq ft, about 3.6 fl oz/1000 sq ft, about 3.7 fl oz/1000 sq ft, about 3.8 fl oz/1000 sq ft, about 3.9 fl oz/1000 sq ft, about 4 fl oz/1000 sq ft, about 4.5 fl oz/1000 sq ft, about 5 fl oz/1000 sq ft, about 6 fl oz/1000 sq ft, about 7 fl oz/1000 sq ft, about 7.5 fl oz/1000 sq ft, about 8 fl oz/1000 sq ft, about 9 fl oz/1000 sq ft, or about 10 fl oz/1000 sq ft. In some embodiments, the total amount of the composition applied per year is about 3.6 fl oz of the composition per 1000 sq ft of turfgrass.

(c) Turfgrass Types

Embodiments of the present disclosure include methods that involve applying at least one application of a composition described above to a turfgrass or to a locus or localized area of the *Poa annua* in said turfgrass, which includes a warm season turfgrass and/or a cool season turfgrass. In some embodiments, the choice of turfgrass is generally made due to the intended us and the climate. Turfgrasses are typically either labeled as cool season or warm season. These seasonal terms are more complex than merely identifying the weather conditions in which they are capable of surviving since the growing season for both categories is the spring and summer to early fall. Instead, the seasonal designation refers to the regional locations where temperatures are in the optimal ranges for the majority of the year, as described below. In some embodiments, the turfgrass can include a warm season turfgrass. In some embodiments, the turfgrass can include a cool season turfgrass. In some embodiments, the turfgrass can include a mixture of a warm season turfgrass and a cool season turfgrass.

Warm Season Turfgrasses

In some embodiments, the turfgrass can include a warm season turfgrass. Warm season turfgrasses thrive during the warmer seasons when temperatures are between 80° F. and 95° F. and are often found in locations where the climate is warm year round. Warm season turfgrasses require plenty of sunlight and can be adversely effected by excess moisture and over-watering. When temperatures drop below 65° F., warm season turfgrasses will start to go dormant and when temperatures drop very low especially for extended periods of time, such as when night time temperatures are below 55° F., warm season grasses can die off completely. In some embodiments, the turfgrass can include a majority of warm season turfgrasses.

In some embodiments, the turfgrass can include a warm season turfgrass, such as bermudagrass (*Cynodon* L. C. Rich), zoysiagrass (*Zoysia* Willd.), St. Augustinegrass (*Stenotaphrum secundatum* (Walt.) Kuntze), centipedegrass (*Eremochloa ophiuroides* (Munro.) Hack.), carpetgrass (*Axonopus* Beauv.), bahiagrass (*Paspalum notatum* Flugge.), kikuyugrass (*Pennisetum clandestinum* Hochst. ex Chiov.), buffalograss (*Buchloe dactyloides* (Nutt.) Engelm.), and seashore *Paspalum* (*Paspalum vaginatum* Swartz). In some embodiments, the warm season turfgrass is bermudagrass.

(ii) Cool Season Turfgrasses

In some embodiments, the turfgrass can include a cool season turfgrass. Cool season turfgrasses often thrive in locations with cold freezing winters and warm summers. Cool season turfgrasses can include turfgrass species with optimum growth at temperatures between 60° F. and 75° F. When temperature are very cold, cool season turfgrasses go almost dormant. Cool season turfgrasses remain in the best condition with consistent rainfall or irrigation. In some embodiments, the turfgrass can include a majority of cool season turfgrasses.

In some embodiments, the turfgrass can include a cool season turfgrass, such as perennial ryegrass (*Lolium perenne* L.), tall fescue (*Festuca arundinacea*), fine fescues (*Festuca ovina* and *Festuca rubra*), Kentucky bluegrass (*Poa prat-*

*ensis*), and bentgrasses (*Agrostis* L.). In some embodiments, the cool season turfgrass is perennial ryegrass.

3. Method of *Poa annua* Control in Overseeded Turfgrasses

Embodiments of the present disclosure include methods of selectively controlling or modifying the growth of *Poa annua* that involve applying at least one application of a composition described above that includes an herbicidally-effective amount of tebuconazole, or a salt thereof, to a turfgrass that is overseeded. The application of the composition to the turfgrass can occur before, and optionally after, overseeding the turfgrass. In some embodiments, the turfgrass comprises a majority of warm season turfgrasses and the turfgrass is overseeded with a cool season turfgrass. Overseeding a warm season turfgrass with a cool season turfgrass provides growing grass for late fall, winter, and early spring and provides color and usability when the warm-season grass would normally go dormant. Overseeding of this type is especially common for athletic fields and golf courses in warmer climates that are used throughout the winter months. In some embodiments, the turfgrass comprises a majority of cool season turfgrasses and the turfgrass is overseeded with a different cool season turfgrass. Overseeding a cool season turfgrass with a different cool season turfgrass increases the overall turf density.

In some embodiments, the turfgrass comprises a majority of warm season turfgrasses and the turfgrass is overseeded with a cool season turfgrass. In some embodiments, the warm season turfgrass can include, but is not limited to, bermudagrass (*Cynodon* L. C. Rich), zoysiagrass (*Zoysia* Willd.), St. Augustinegrass (*Stenotaphrum secundatum* (Walt.) Kuntze), centipedegrass (*Eremochloa ophiuroides* (Munro.) Hack.), carpetgrass (*Axonopus* Beauv.), bahiagrass (*Paspalum notatum* Flugge.), kikuyugrass (*Pennisetum clandestinum* Hochst. ex Chiov.), buffalograss (*Buchloe dactyloides* (Nutt.) Engelm.), and seashore *Paspalum* (*Paspalum vaginatum* Swartz). In some embodiments the cool season turfgrass can include, but is not limited to, perennial ryegrass (*Lolium perenne* L.), tall fescue (*Festuca arundinacea*), fine fescues (*Festuca ovina* and *Festuca rubra*), Kentucky bluegrass (*Poa pratensis*), and bentgrasses (*Agrostis* L.). In some embodiments, the turfgrass can include bermudagrass that is overseeded with perennial ryegrass.

(a) Before Overseeding

In some embodiments, at least one application of the composition is applied to the turfgrass before the turfgrass is overseeded with a cool season turfgrass. In some embodiments, between one and five applications are applied to the turfgrass before it is overseeded with the cool season turfgrass. In some embodiments, at least one application can be applied to the turfgrass within about 14 days to about 60 days in advance of overseeding the turfgrass with the cool season turfgrass. For example, at least one application can be applied about 1 day, about 7 days, about 14 days, about 21 days, about 28 days, about 35 days, about 42 days, about 49 days, about 56 days, or about 60 days in advance of overseeding the turfgrass with the cool season turfgrass.

In some embodiments, at least two applications of the composition can be applied to the turfgrass within about 14 days to about 60 days in advance of overseeding. In some embodiments, a first application can be applied about 35 days to about 60 days prior to overseeding and the second application can be applied at least 14 days to about 34 days prior to overseeding. In some embodiments a first application can be applied about 30 days in advance of overseeding and a second application can be applied about 14 days in advance of overseeding. In some embodiments a first application can be applied about 37 days in advance of overseeding and a second application can be applied about 30 days in advance of overseeding. In some embodiments a first application can be applied about 51 days in advance of overseeding and a second application can be applied about 30 days in advance of overseeding.

(b) After Overseeding

A second *Poa annua* germination can occur during the cooler months of winter. In some embodiments, the methods described above can further include an application of the composition applied after the turfgrass is overseeded. For example, if two applications of the composition are applied to the turfgrass before overseeding, a third application of the complication can be applied after the turfgrass is overseeded. In some embodiments, the application of the composition can be applied at least about 40 days to about 80 days after the turfgrass is overseeded.

4. Combination with Other Compounds

Embodiments of the present disclosure include methods, as described above, applying at least one application of the composition described above with a plant nutrient or pesticide. In some embodiments, the composition can be applied with a plant nutrient or pesticide, including, but not limited, a different herbicide, an insecticide, a fungicide, a bactericide, an acaracide, a nematicide, a wetting agent, a plant growth regulator, growth stimulants, and/or a herbicide safener. In some embodiments, the composition can be applied with a different herbicide, such as prodiamine or penoxsulam.

EXAMPLES

The foregoing may be better understood by reference to the following examples, which are presented for purposes of illustration and are not intended to limit the scope of the invention.

Example 1

Methods and Materials

Chemicals. The plant pesticides utilized in the present disclosure are described below in Table 1.

TABLE 1

Plant Pesticides and their active ingredients

| Commercial Product | Active Ingredient | Percentage of Active Ingredient in Formulation (%) |
|---|---|---|
| TORQUE ™ | Tebuconazole | 38.7 |
| TRINITY ® | Triticonazole | 19.2 |
| TOURNEY ® | Metaconazole | 50 |
| RUBIGAN ® | Fenarimol | 11.6 |
| BARRICADE ® | Prodiamine | 40.7 |
| Prodiamine | Prodiamine | 65 |
| KERB ® | Pronamide | 50 |
| SENTINEL ® | Cyproconazole | 40 |
| SAPPHIRE ® | Penoxsulam | 3.68 |

Example 2

Control of *Poa annua* Populations in Perennial Ryegrass with Tebuconazole

A research trial was established at the North Carolina State University Turfgrass Field Laboratory in Raleigh, N.C. to examine the herbicidal effects of demethylation inhibiting (DMI) fungicides on perennial ryegrass quality and annual bluegrass (*Poa annua*) control. Five DMI fungicides and two control herbicides were each sprayed onto four individual plots of bermudagrass, 5 feet by 10 feet, according to the dosage rates in Table 2. The first treatment was applied to the bermudagrass on August 31st and a second, identical treatment followed on September 7th. One month later (October 7), the bermudagrass was overseeded with perennial ryegrass.

TABLE 2

Plant Pesticide Treatment Dosage Rates

| Treatment Name | Form | Dosage Rate | Amount Product per 1 L Mix |
|---|---|---|---|
| TORQUE ™ | 3.6 L | 1.8 fl oz/1000 ft² | 19.14 ml |
| TRINITY ® | 1.7 L | 3 fl oz/1000 ft² | 31.9 ml |
| TOURNEY ® | 50WG | 8 oz/acre (0.18 oz/1000 ft2) | 1.872 g |
| RUBIGAN ® | 1AS | 6 fl oz/1000 ft² | 63.81 ml |
| BARRICADE ® | 4 L | 1 lb ai/acre | 7.812 ml |
| KERB ® | 50WG | 1 lb ai/acre | 7.489 g |
| SENTINEL ® | 40WG | 0.5 oz wt/1000 ft² | 5.097 g |
| SENTINEL ® | 40WG | 1 oz wt/1000 ft² | 10.19 g |

Perennial ryegrass populations were visually estimated every 2 weeks from October through April (Table 3). The most representative rating date for phytotoxicity to ryegrass was in November, which corresponds to ryegrass emergence following overseeding. If ryegrass was injured due to treatment, there would be a delay in or a reduction of ryegrass seed germination. The product containing tebuconazole (TORQUE™) did not cause any damage to the ryegrass when compared to the untreated control (Table 5). The known herbicides, Prodiamine (BARRICADE®) and Pronamine (KERB®), had strong phytotoxic effects on the perennial ryegrass population.

*Poa annua* populations were visually estimated every 2 weeks from February through April (Table 4). *Poa annua* germinated in early fall, matured throughout fall, and produced seeds in the spring. A second *Poa annua* germination was also possible in winter. Therefore, the most representative date for evaluating *Poa* populations was in late April. The use of tebuconazole (TORQUE™) reduced the percentage of *Poa annua* in the test plots down to 4.3%, which was significantly lower than the untreated control that had 21.3% *Poa annua*, and similar efficacy to the known herbicides tested (6.3% *Poa annua* with prodiamine (BARRICADE®) and 8.8% *Poa annua* with pronamine (KERB®)) (Table 5). However, other demethylation inhibiting (DMI) fungicides including triticonazole (TRINITY®), metaconazole (TOURNEY®) and fenarimol (RUBIGAN®), did not show significant reduction of *Poa annua* over the controls. These data show that the ability of tebuconazole to provide excellent control of *Poa annua* while maintaining the quality of the ryegrass was unique to tebuconazole.

TABLE 3

Effects of fungicide and herbicide treatment on the % perennial ryegrass populations in bermudagrass overseeded with perennial ryegrass

| Crop Name | | perennial ryegrass | | | | | |
|---|---|---|---|---|---|---|---|
| Part Rated | | Plant C | | | | | |
| Number of Subsamples | | 1 | 1 | 1 | 1 | 1 | 1 |
| Days After First/Last Application | | 44/30 | 58/44 | 72/58 | 86/72 | 155/141 | 169/155 |
| 1ˢᵗ Treatment to Evaluation Interval | | 44 Days | 58 Days | 72 Days | 86 Days | 155 Days | 169 Days |
| Rating Date | | Oct. 14, 2016 | Oct. 28, 2016 | Nov. 11, 2016 | Nov. 25, 2016 | Feb. 2, 2017 | Feb. 16, 2017 |
| Rating | | % ryegrass | | | | | |
| Treatment Name | Rate | | | | | | |
| Untreated | | 51.3a | 83.8a | 96.3a | 93.8ab | 95.8a | 95.8a |
| TORQUE ™ | 1.8 fl oz/1000 ft² | 50.0a | 72.5ab | 97.5a | 98.8a | 99.5a | 99.5a |
| TRINITY ® | 3 fl oz/1000 ft² | 48.8a | 75.0ab | 91.3ab | 92.5ab | 96.3a | 96.3a |
| TOURNEY ® | 8 oz/acre | 37.5ab | 72.5ab | 90.0ab | 93.8ab | 97.0a | 97.0a |
| RUBIGAN ® | 6 fl oz/1000 ft² | 27.5bc | 70.0b | 91.3ab | 88.8ab | 96.3a | 96.3a |
| BARRICADE ® | 1 lb ai/acre | 5.0de | 5.0e | 5.0e | 8.8d | 36.3c | 38.8c |
| KERB ® | 1 lb ai/acre | 2.5e | 10.0e | 33.8d | 36.3c | 78.8b | 81.3b |
| SENTINEL ® | 0.5 oz wt/1000 ft² | 22.5bcd | 51.3c | 83.8bc | 92.5ab | 99.0a | 99.0a |
| SENTINEL ® | 1 oz wt/1000 ft² | 12.5cde | 38.8d | 75.0c | 87.5b | 98.3a | 98.3a |
| LSD P = .05 | | 17.66 | 12.26 | 11.06 | 10.18 | 13.84 | 11.75 |
| Standard Deviation | | 12.10 | 8.40 | 7.58 | 6.98 | 9.48 | 8.05 |
| CV | | 42.3 | 15.79 | 10.27 | 9.07 | 10.71 | 9.03 |
| Replicate F | | 1.587 | 1.480 | 0.238 | 1.845 | 0.800 | 0.607 |
| Replicate Prob(F) | | 0.2186 | 0.2451 | 0.8690 | 0.1659 | 0.5060 | 0.6170 |
| Treatment F | | 10.214 | 48.465 | 72.944 | 83.026 | 18.889 | 23.881 |
| Treatment Prob(F) | | 0.0001 | 0.0001 | 0.0001 | 0.0001 | 0.0001 | 0.0001 |
| Crop Name | | perennial ryegrass | | | | | |
| Part Rated | | Plant C | | | | | |
| Number of Subsamples | | 1 | 1 | 1 | 1 | 1 | |
| Days After First/Last Application | | 183/169 | 197/183 | 211/197 | 225/211 | 239/225 | |
| 1ˢᵗ Treatment to Evaluation Interval | | 183 Days | 197 Days | 211 Days | 225 Days | 239 Days | |
| Rating Date | | Mar. 2, 2017 | Mar. 16, 2017 | Mar. 30, 2017 | Apr. 13, 2017 | Apr. 27, 2017 | |
| Rating | | % ryegrass | | | | | |

TABLE 3-continued

Effects of fungicide and herbicide treatment on the % perennial ryegrass populations in bermudagrass overseeded with perennial ryegrass

| Treatment Name | Rate | | | | | |
|---|---|---|---|---|---|---|
| Untreated | | 88.8a | 85.0a | 82.5a | 80.0b | 78.8b |
| TORQUE ™ | 1.8 fl oz/1000 ft² | 98.0a | 96.5a | 96.5a | 95.8a | 95.8a |
| TRINITY ® | 3 fl oz/1000 ft² | 92.5a | 90.0a | 88.8a | 86.3ab | 85.0ab |
| TOURNEY ® | 8 oz/acre | 94.5a | 91.3a | 87.5a | 87.5ab | 86.3ab |
| RUBIGAN ® | 6 fl oz/1000 ft² | 95.0a | 92.5a | 91.3a | 90.0ab | 90.0ab |
| BARRICADE ® | 1 lb ai/acre | 40.0c | 40.0c | 42.5c | 43.8c | 43.8c |
| KERB ® | 1 lb ai/acre | 87.8b | 87.0b | 87.0b | 86.3ab | 85.0ab |
| SENTINEL ® | 0.5 oz wt/1000 ft² | 92.8a | 88.8a | 85.0a | 83.8ab | 83.8ab |
| SENTINEL ® | 1 oz wt/1000 ft² | 96.0a | 93.3a | 90.0a | 90.0ab | 90.0ab |
| LSD P = .05 | | 11.00 | 12.32 | 14.08 | 12.07 | 11.80 |
| Standard Deviation | | 7.54 | 8.44 | 9.65 | 8.27 | 8.08 |
| CV | | 8.64 | 9.94 | 11.56 | 10.01 | 9.86 |
| Replicate F | | 0.096 | 0.170 | 0.413 | 0.811 | 0.576 |
| Replicate Prob(F) | | 0.9617 | 0.9157 | 0.7452 | 0.5003 | 0.6363 |
| Treatment F | | 22.854 | 16.587 | 10.803 | 13.537 | 13.997 |
| Treatment Prob(F) | | 0.0001 | 0.0001 | 0.0001 | 0.0001 | 0.0001 |

TABLE 4

Effects of fungicide and herbicide treatment on the % *Poa Annua* populations in bermudagrass overseeded with perennial ryegrass

| Crop Name | | perennial ryegrass | | | | | | |
|---|---|---|---|---|---|---|---|---|
| Part Rated | | Plant C | | | | | | |
| Number of Subsamples | | 1 | 1 | 1 | 1 | 1 | 1 | 1 |
| Days After First/Last Application | | 155/141 | 169/155 | 183/169 | 197/183 | 211/197 | 225/211 | 239/225 |
| 1st Treatment to Evaluation Interval | | 155 Days | 169 Days | 183 Days | 197 Days | 211 Days | 225 Days | 239 Days |
| Rating Date | | Feb. 2, 2017 | Feb. 16, 2017 | Mar. 2, 2017 | Mar. 16, 2017 | Mar. 30, 2017 | Apr. 13, 2017 | Apr. 27, 2017 |
| Rating | | % *Poa Annua* | | | | | | |

| Treatment Name | Rate | | | | | | | |
|---|---|---|---|---|---|---|---|---|
| Untreated | | 3.5a | 3.5a | 11.3a | 15.0a | 17.5a | 20.0a | 21.3a |
| TORQUE ™ | 1.8 fl oz/1000 ft² | 0.5c | 0.5c | 2.0b | 3.5b | 3.5c | 4.3c | 4.3c |
| TRINITY ® | 3 fl oz/1000 ft² | 1.8abc | 1.8abc | 6.3ab | 10.0ab | 11.3abc | 13.8abc | 15.0ab |
| TOURNEY ® | 8 oz/acre | 1.0bc | 1.0cb | 4.3b | 7.5ab | 11.3abc | 11.3abc | 12.5abc |
| RUBIGAN ® | 6 fl oz/1000 ft² | 3.0ab | 3.0ab | 5.0b | 7.5ab | 8.8abc | 10.0bc | 10.0bc |
| BARRICADE ® | 1 lb ai/acre | 1.0bc | 2.8abc | 3.5b | 5.5b | 6.3bc | 6.3c | 6.3bc |
| KERB ® | 1 lb ai/acre | 0.5c | 1.0bc | 2.0b | 2.8b | 2.8c | 6.8bc | 8.8bc |
| SENTINEL ® | 0.5 oz wt/1000 ft² | 1.0bc | 1.0bc | 7.3ab | 11.3ab | 15.0ab | 16.3ab | 15.0ab |
| SENTINEL ® | 1 oz wt/1000 ft² | 0.5c | 0.5c | 4.0b | 6.8ab | 10.0abc | 10.0bc | 10.0bc |
| LSD P = .05 | | 2.26 | 2.29 | 5.72 | 8.60 | 10.64 | 9.58 | 9.05 |
| Standard Deviation | | 1.55 | 1.57 | 3.92 | 5.89 | 7.29 | 6.56 | 6.20 |
| CV | | 109.52 | 94.21 | 77.58 | 76.04 | 76.06 | 59.95 | 54.21 |
| Replicate F | | 0.965 | 1.262 | 1.187 | 1.255 | 1.511 | 2.673 | 1.855 |
| Replicate Prob(F) | | 0.4252 | 0.3097 | 0.3357 | 0.3121 | 0.2372 | 0.0701 | 0.1642 |
| Treatment F | | 2.077 | 2.104 | 2.193 | 1.715 | 1.819 | 2.373 | 2.763 |
| Treatment Prob(F) | | 0.0795 | 0.0760 | 0.0655 | 0.1461 | 0.1228 | 0.0485 | 0.0256 |

TABLE 5

Demethylation inhibiting fungicide and herbicide effects on percent perennial ryegrass and *Poa annua* in bermudagrass overseeded with perennial ryegrass.

| Treatment Name | Dose Rate | % Ryegrass Nov. 11 | % *Poa Annua* Apr. 27 |
|---|---|---|---|
| Untreated | | 96 | 21.3 |
| TORQUE ™ | 1.8 fl oz/1000 ft² | 98 | 4.3 |
| TRINITY ® | 3 fl oz/1000 ft² | 91 | 15 |
| TOURNEY ® | 0.18 oz/1000 ft² | 90 | 12.5 |
| RUBIGAN ® | 6 fl oz/1000 ft² | 91 | 10 |
| BARRICADE ® | 1 lb ai/acre | 5 | 6.3 |
| KERB ® | 1 lb ai/acre | 34 | 8.8 |
| SENTINEL ® | 0.5 oz wt/1000 ft² | 84 | 15 |
| SENTINEL ® | 1 oz wt/1000 ft² | 75 | 10 |
| LSD P = 0.05 | | 11.1 | 9.05 |

Example 3

Control of *Poa annua* Populations in Perennial Ryegrass with Tebuconazole

A field trial was established at the Sage Valley Golf Club in Graniteville, S.C. to examine the herbicidal effects of demethylation inhibiting (DMI) fungicides on perennial ryegrass quality and annual bluegrass (*Poa annua*) control. Five DMI fungicides and two control herbicides were sprayed onto three individual plots of bermudagrass, each 5 feet by 10 feet, according to the dosages in Table 6. The first treatment was applied on August 2nd and a second, identical treatment was applied on August 23rd. One month later (September 23), the bermudagrass was overseeded with perennial ryegrass. One additional control herbicide, Penoxsulam (SAPPHIRE®), was sprayed onto similar plots after ryegrass and *Poa annua* had emerged following overseeding.

TABLE 6

Plant Pesticide Treatment Dosage Rates

| Treatment Name | Form | Dosage Rate |
|---|---|---|
| TORQUE ™ | 3.6 L | 1.8 fl oz/1000 ft$^2$ |
| TRINITY ® | 1.7 L | 3 fl oz/1000 ft$^2$ |
| TOURNEY ® | 50WG | 8 oz/acre (0.18 oz/1000 ft$^2$) |
| RUBIGANt | 1AS | 6 fl oz/1000 ft$^2$ |
| Prodiamine | 4F | 1 lb ai/acre |
| KERB ® | 50WG | 1 lb ai/acre |
| SENTINEL ® | 40WG | 0.5 oz wt/1000 ft$^2$ |
| SENTINEL ® | 40WG | 1 oz wt/1000 ft$^2$ |
| SAPPHIRE ® | 0.31 L | 10 fl oz/acre |

Perennial ryegrass turf quality was estimated every two weeks following on a scale of 1-9, where 9 represented perfect turf quality (Table 7). The most representative date for assessing phytotoxicity to ryegrass was November. As shown in Table 9, no adverse effects to ryegrass were observed with the application of tebuconazole (TORQUE™).

The percent control of *Poa annua* populations was visually estimated in comparison to a non-treated plot every 2 weeks from October through April (Table 8). The best time to observe knockdown of both fall and winter germinated *Poa annua* was in mid-late April. Tebuconazole (TORQUE™) provided 93% control of *Poa annua* in the field trial. These results show the efficacy of tebuconazole in provided control of *Poa annua* in perennial ryegrass.

TABLE 7

Effects of fungicide and herbicide treatment on the health of the perennial ryegrass in bermudagrass overseeded with perennial ryegrass

| | | | | |
|---|---|---|---|---|
| Crop Code | | LOLPE | LOLPE | LOLPE |
| Crop Name | | Perennial Ryegrass | Perennial Ryegrass | Perennial Ryegrass |
| Pail Rated | | SHOOT | SHOOT | SHOOT |
| Number of Subsamples. | | 1 | 1 | 1 |
| Days After First/Last Application | | 97/76 | 231/134 | 258/161 |
| Rating Date | | Nov. 7, 2016 | Mar. 21, 2017 | Apr. 17, 2017 |
| Rating Type | | COLOR | COLOR | COLOR |
| Rating Unit | | 0-9 | 0-9 | 0-9 |

| Treatment Name | Rate | | | |
|---|---|---|---|---|
| Untreated | | 7 | 8 | 8 |
| TORQUE ™ | 1.8 fl oz/1000 ft$^2$ | 7 | 8 | 8 |
| TRINITY ® | 3 fl oz/1000 ft$^2$ | 7 | 8 | 8 |
| TOURNEY ® | 8 oz/acre | 7 | 8 | 8 |
| RUBIGAN ® | 6 fl oz/1000 ft$^2$ | 7 | 8 | 8 |
| Prodiamine | 1 lb ai/acre | 7 | 8 | 8 |
| KERB ® | 1 lb ai/acre | 7 | 8 | 8 |
| SENTINEL ® | 0.5 oz wt/1000 ft$^2$ | 8 | 8 | 8 |
| SENTINEL ® | 1 oz wt/1000 ft$^2$ | 9 | 8 | 8 |
| SAPPHIRE ® | 10 fl oz/acre | 7 | 8 | 7 |
| Skewness | | 2.0224* | -2.8091* | -2.8091* |
| Kurtosis | | 2.7867* | 6.3081* | 6.3081* |
| Replicate F | | | | |
| Replicate Prob(F) | | 1 | 1 | 1 |
| Treatment F | | | | |
| Treatment Prob(F) | | 1 | 1 | 1 |

TABLE 8

Effects of fungicide and herbicide treatment on the % *Poa Annua* populations in bermudagrass overseeded with perennial ryegrass

| | | | | | |
|---|---|---|---|---|---|
| Pest Name | Annual Bluegrass | | | | |
| Part Rated | Shoot | | | | |
| Number of Subsamples. | 1 | 1 | 1 | 1 | 1 |
| Days After First/Last Application | 97/76 | 231/134 | 231/134 | 258/161 | 258/161 |
| Rating Date | Nov. 7, 2016 | Mar. 21, 2017 | Mar. 21, 2017 | Apr. 17, 2017 | Apr. 17, 2017 |
| Rating Type | COUNT | COUNT | KNOCKDOWN | COUNT | KNOCKDOWN |
| Rating Unit | NUMBER | NUMBER | % UNTREATED | NUMBER | % UNTREATED |

TABLE 8-continued

Effects of fungicide and herbicide treatment on the % Poa Annua populations in bermudagrass overseeded with perennial ryegrass

| Treatment Name | Rate | | | | | |
|---|---|---|---|---|---|---|
| Untreated | | 0 | 1.0b | 0 | 3.9b | 0b |
| TORQUE ™ | 1.8 fl o/1000 ft² | 0 | 0.0b | 66.7 | 0.1b | 93.3ab |
| TRINITY ® | 3 fl oz/1000 ft² | 0 | 0.2b | 50.0 | 1.5b | 60.6ab |
| TOURNEY ® | 8 oz/acre | 0 | 0.6b | 50.0 | 1.8b | 50.0ab |
| RUBIGAN ® | 6 fl oz/1000 ft² | 0 | 0.8b | 41.7 | 2.8b | 25.0ab |
| Prodiamine | 1 lb ai/acre | 0 | 0.0b | 66.7 | 0.0b | 100a |
| KERB ® | 1 lb ai/acre | 0 | 0.0b | 66.7 | 0.6b | 75.0ab |
| SENTINEL ® | 0.5 oz wt/1000 ft² | 0 | 0.8b | 8.3 | 2.7b | 13.0ab |
| SENTINEL ® | 1 oz wt/1000 ft² | 0 | 0.4b | 33.3 | 2.9b | 38.0ab |
| SAPPHIRE ® | 10 fl oz/acre | 0 | 6.8a | 0 | 12.3a | 0.0b |
| LSD P = 0.5 | | | 2.27-4.49 | 59.62 | 2.47-7.08 | 56.21-74.97 |
| Standard Deviation | | | 3.72t | 34.44 | 4.28t | 28.31t |
| CV | | | 87.49t | 97.89 | 52.42t | 69.0t |
| Bartlett's X2 | | | 0.86 | 3.028 | 5.51 | 2.346 |
| P(Bartlett's X2) | | | 0.99 | 0.805 | 0.702 | 0.885 |
| Skewness | | | 1.0349 | 0.6937 | 0.3599 | 0.1063 |
| Kurtosis | | | 0.2557 | −1.4512 | −0.6467 | −1.7258* |
| Replicate F | | | 1.545 | 7.102 | 1.900 | 2.646 |
| Replicate Prob(F) | | | 0.2402 | 0.0062 | 0.1783 | 0.0983 |
| Treatment F | | | 4.314 | 1.790 | 5.292 | 3.294 |
| Treatment Prob(F) | | | 0.0040 | 0.1530 | 0.0013 | 0.0150 |

TABLE 9

DMI fungicide and herbicide effects on turf quality of perennial ryegrass and Poa annua control in bermudagrass overseeded with perennial ryegrass.

| Treatment Name | Dose Rate | Turf Quality (1-9) Nov. 7 | % Control Poa Annua Apr. 17 |
|---|---|---|---|
| Untreated | | 7 | 0 |
| TORQUE ™ | 1.8 fl oz/1000 ft² | 7 | 93 |
| TRINITY ® | 3 fl oz/1000 ft² | 7 | 61 |
| TOURNEY ® | 0.18 oz/1000 ft² | 7 | 50 |
| RUBIGAN ® | 6 fl oz/1000 ft² | 7 | 25 |
| Prodiamine | 1 lb ai/acre | 7 | 100 |
| KERB ® | 1 lb ai/acre | 7 | 75 |
| SENTINEL ® | 0.5 oz wt/1000 ft² | 8 | 13 |
| SENTINEL ® | 1 oz wt/1000 ft² | 9 | 38 |
| SAPPIERE® | 10 fl oz/acre | 7 | 0 |
| LSD P = 0.05 | | | 28.3 |

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

For reasons of completeness, various aspects of the invention are set out in the following numbered clauses:

Clause 1. A method for selectively controlling or modifying the growth of Poa annua in a turfgrass without causing significant injury to the turfgrass, the method comprising applying at least one application of a composition to the turfgrass or to the locus of the Poa annua in such turfgrass, the composition comprising an herbicidally-effective amount tebuconazole, or a salt thereof.

Clause 2. The method of clause 1, wherein the composition comprises about 30-50% (wt/wt) tebuconazole, or a salt thereof.

Clause 3. The method of clause 1 or 2, wherein the composition comprises about 38.7% (wt/wt) tebuconazole, or a salt thereof.

Clause 4. The method of any one of clauses 1-3, wherein the composition is in a form selected from a granule, a wettable powder, an emulsifiable concentrate, a dust, a flowable powder, a solution, a suspension, an emulsion, or a microcapsule.

Clause 5. The method of clause 4, wherein the composition is a suspension.

Clause 6. The method of clause 4 or 5, wherein the application of the composition comprises applying the composition at a rate of coverage between about 0.5 fl oz of the composition per 1000 sq ft of turfgrass to about 5 fl oz of the composition per 1000 sq ft of turfgrass.

Clause 7. The method of clause 6, wherein the application of the composition comprises applying the composition at a rate of coverage of about 1.8 fl oz of the composition per 1000 sq ft of turfgrass.

Clause 8. The method of any one of clauses 1-7, wherein the total number of applications of the composition per year is between one and five.

Clause 9. The method of any one of clauses 1-8, wherein the total amount of the composition applied per year is between about 0.5 fl oz of the composition per 1000 sq ft of turfgrass to about 5 fl oz of the composition per 1000 sq ft of turfgrass.

Clause 10. The method of any one of clauses 1-9, wherein the total amount of the composition applied per year is about 3.6 fl oz of the composition per 1000 sq ft of turfgrass.

Clause 11. The method of any one of clauses 1-10, wherein the turfgrass comprises a warm season turfgrass and/or a cool season turfgrass.

Clause 12. The method of any one of clauses 1-11, wherein the turfgrass comprises a warm season turfgrass that is overseeded with a cool season turfgrass.

Clause 13. The method of any one of clauses 11 or 12, wherein the warm season turfgrass is selected from bermudagrass (Cynodon L. C. Rich), zoysiagrass (Zoysia Willd.), St. Augustinegrass (Stenotaphrum secundatum (Walt.) Kuntze), centipedegrass (*Eremochloa ophiuroides* (Munro.) Hack.), carpetgrass (*Axonopus* Beauv.), bahiagrass (*Paspalum notatum* Flugge.), kikuyugrass (*Pennisetum clandestinum* Hochst. ex Chiov.), buffalograss (*Buchloe dactyloides* (Nutt.) Engelm.), and seashore Paspalum (*Paspalum vaginatum* Swartz).

Clause 14. The method of any one of clauses 11-13, wherein the warm season turfgrass is bermudagrass.

Clause 15. The method of any one of clauses 11-14, wherein the cool season turfgrass is selected from perennial ryegrass (*Lolium perenne* L.), tall fescue (*Festuca arundinacea*), fine fescue (*Festuca ovina*), fine fescue (*Festuca rubra*), Kentucky bluegrass (*Poa pratensis*), and bentgrasses (*Agrostis* L.).

Clause 16. The method of any one of clauses 11-15, wherein the cool season turfgrass is perennial ryegrass (*Lolium perenne* L.).

Clause 17. The method of clause 16, wherein at least two applications of the composition are applied to the turfgrass within about 14 to about 60 days in advance of overseeding with the cool season turfgrass.

Clause 18. The method of clause 17, wherein a first application of the composition is applied at least about 35 days to about 60 days before overseeding with the cool season turfgrass and a second application of the application is applied at least about 14 days to about 34 days before overseeding with the cool season turfgrass.

Clause 19. The method of clause 18, wherein a third application of the composition is applied at least about 40 days to about 80 days after the overseeding with the cool season turfgrass.

Clause 20. The method of any one of clauses 1-19, further comprising applying a different herbicide, an insecticide, a fungicide, a bactericide, an acaracide, a nematicide, a wetting agent, a plant growth regulator, growth stimulants, and/or a herbicide safener to the turfgrass with the at least one application of the composition.

Clause 21. The method of clause 20, wherein the different herbicide comprises prodiamine or penoxsulam.

Clause 22. The method of any one of clauses 1-20, wherein the growth of the *Poa annua* in the turfgrass is reduced compared to the growth of the *Poa annua* in a control turfgrass that has not been given an application of the composition.

What is claimed is:

1. A method for selectively controlling or modifying the growth of *Poa annua* in a turfgrass without causing significant injury to the turfgrass as compared to an untreated turfgrass control, the method comprising applying at least one application of a composition comprising an herbicidally-effective amount of tebuconazole, or a salt thereof, to the turfgrass or to a locus of the *Poa annua* in the turfgrass, wherein the turfgrass comprises a warm season turfgrass that is overseeded with a cool season turfgrass; and wherein the warm season grass comprises bermudagrass and the cool season grass comprises perennial ryegrass.

2. The method of claim 1, wherein the composition comprises about 30-50% (wt/wt) tebuconazole, or a salt thereof.

3. The method of claim 1, wherein the composition comprises about 38.7% (wt/wt) tebuconazole, or a salt thereof.

4. The method of claim 1, wherein the composition is in a form selected from a granule, a wettable powder, an emulsifiable concentrate, a dust, a flowable powder, a solution, a suspension, an emulsion, or a microcapsule.

5. The method of claim 4, wherein application of the composition comprises applying the composition at a rate of coverage between about 0.5 fl oz of the composition per 1000 sq ft of turfgrass to about 5 fl oz of the composition per 1000 sq ft of turfgrass.

6. The method of claim 5, wherein the application of the composition comprises applying the composition at a rate of coverage of about 1.8 fl oz of the composition per 1000 sq ft of turfgrass.

7. The method of claim 1, wherein total number of applications of the composition per year ranges from one to five.

8. The method of claim 1, wherein total amount of the composition applied per year is between about 0.5 fl oz of the composition per 1000 sq ft of turfgrass to about 5 fl oz of the composition per 1000 sq ft of turfgrass.

9. The method of claim 7, wherein at least two applications of the composition are applied to the turfgrass within about 14 to about 60 days in advance of overseeding with the perennial ryegrass.

10. The method of claim 9, wherein a first application of the composition is applied at least about 28 days to about 60 days before overseeding with the perennial ryegrass and a second application of the application is applied at least about 14 days to about 34 days before overseeding with the perennial ryegrass.

11. The method of claim 10, wherein a third application of the composition is applied at least about 40 days to about 80 days after the overseeding with the perennial ryegrass.

12. The method of claim 1, further comprising applying a different herbicide, an insecticide, a fungicide, a bactericide, an acaracide, a nematicide, a wetting agent, a plant growth regulator, growth stimulants, and/or a herbicide safener to the turfgrass with the at least one application of the composition.

13. The method of claim 12, wherein the different herbicide comprises prodiamine or penoxsulam.

14. The method of claim 1, wherein the growth of the *Poa annua* in the turfgrass is reduced compared to the growth of the *Poa annua* in a control turfgrass that has not been given an application of the composition.

* * * * *